United States Patent
Piazza

Patent Number: 5,586,484
Date of Patent: Dec. 24, 1996

[54] EXPRESSO COFFEE MAKER

[76] Inventor: Pietro Piazza, 11 Catherine Dr., Prospect, Conn. 06712

[21] Appl. No.: 344,847

[22] Filed: Oct. 25, 1994

[51] Int. Cl.⁶ ................................................. A47J 31/24
[52] U.S. Cl. ........................... 99/287; 99/292; 99/302 P; 426/433
[58] Field of Search .......................... 99/279, 287, 292, 99/297, 299, 300, 302 R, 302 P, 307, 308, 313, 314; 426/433

[56] References Cited

U.S. PATENT DOCUMENTS

| | | | |
|---|---|---|---|
| 3,077,156 | 2/1963 | Egi et al. | 99/287 |
| 3,137,228 | 6/1964 | Elow | 99/287 |
| 3,307,474 | 3/1967 | Kasher | 99/287 |
| 3,339,476 | 9/1967 | De Troya | 99/287 |
| 3,927,608 | 12/1975 | Doyel | 99/297 |

*Primary Examiner*—Robert W. Jenkins
*Attorney, Agent, or Firm*—Charles Blaich

[57] ABSTRACT

An improved expresso coffee maker comprising an upper cylindrical container 2 threadably engaged onto a lower truncated-cone container 1, said lower container having a coffee basket assembly 3 in which a cylindrical coffee holder 4 is centered with a piston 5 sliding inside, said piston has apertures 6 to allow passage of water and steam and to create differential pressure above and below the piston, which forces the piston to compress the coffee grounds during the brewing process. The water extract of the coffee grounds passes through inverted funnel 15 and it is collected into the upper cylindrical container.

6 Claims, 3 Drawing Sheets

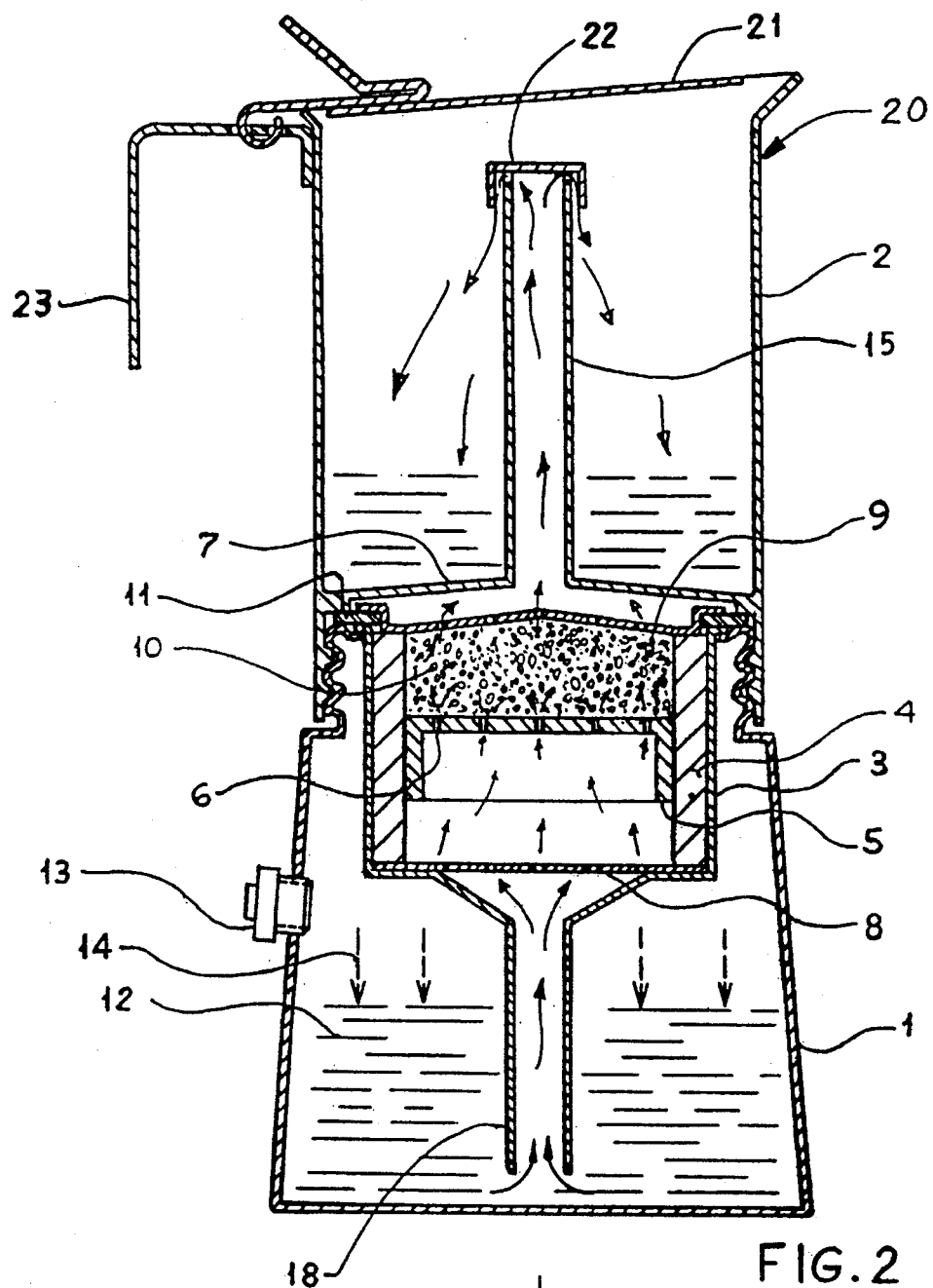
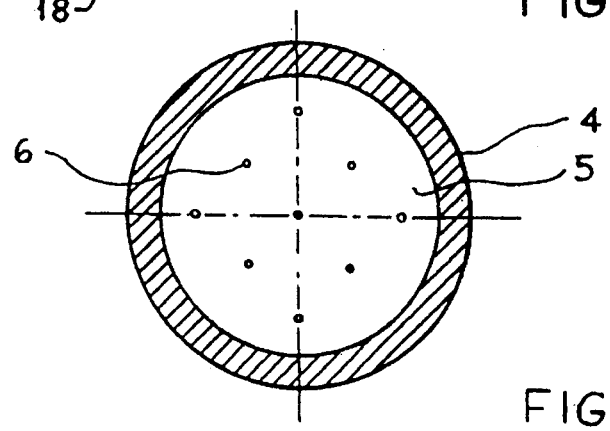
FIG. 2
FIG. 3 ns. 5,586,484

EXPRESSO COFFEE MAKER

FIELD OF THE INVENTION

This invention relates to expresso coffee makers, specifically to such coffee makers which are used for making expresso coffee requiring high temperature and pressure.

BACKGROUND ART

Many prior art of coffee makers are available. There has been a myriad of different type of coffee makers throughout the last two centuries, and all the coffee makers have been similarly constructed by the same fundamental concept design. All of the above differ from the present invention.

OBJECT OF THE INVENTION

The object of the instant invention are:
(a) to provide a simple device to make expresso coffee without expensive commercial coffee makers;
(b) to provide an expresso coffee maker that requires lesser amount of coffee providing the same or improved brew strength;
(c) to provide a stove top expresso coffee maker which permits the home maker to make expresso coffee without the requirement for an expensive commercial machine;
(d) to provide an expresso coffee maker which can be used easily and conveniently for commercial use;
Still further objects and advantages will become apparent from a consideration of the insuing description and drawings.

SUMMARY OF THE INVENTION

The improved expresso coffee pot detailed herein has four components, an upper brewed coffee container, a lower water heating container, a coffee brewing assembly which includes a cylindrical coffee grounds holder and a cylindrical piston which tightly fits the internal dimensions of the coffee holder. The four components are threadably assembled into a hermetically sealed unit. In practice, expresso coffee is brewed by heating water in the lower container generating steam. This forces the piston upward into the coffee grounds containing container, compressing the coffee grounds with a force proportional to the differential pressure above and below the piston as heated water is forced through the grounds extracting coffee essence to make outstanding expresso coffee.

BRIEF DESCRIPTION OF THE DRAWING

FIG. 2 is a sectional view illustrating the components with the piston in compressed position;

FIG. 3 is a top view of the piston and cylindrical coffee holder.

DETAILED DESCRIPTION

The inventive system comprises a piston and a cylinder located within the coffee brewing chamber of a coffee maker for expresso or similar type coffee.

Figure 1:
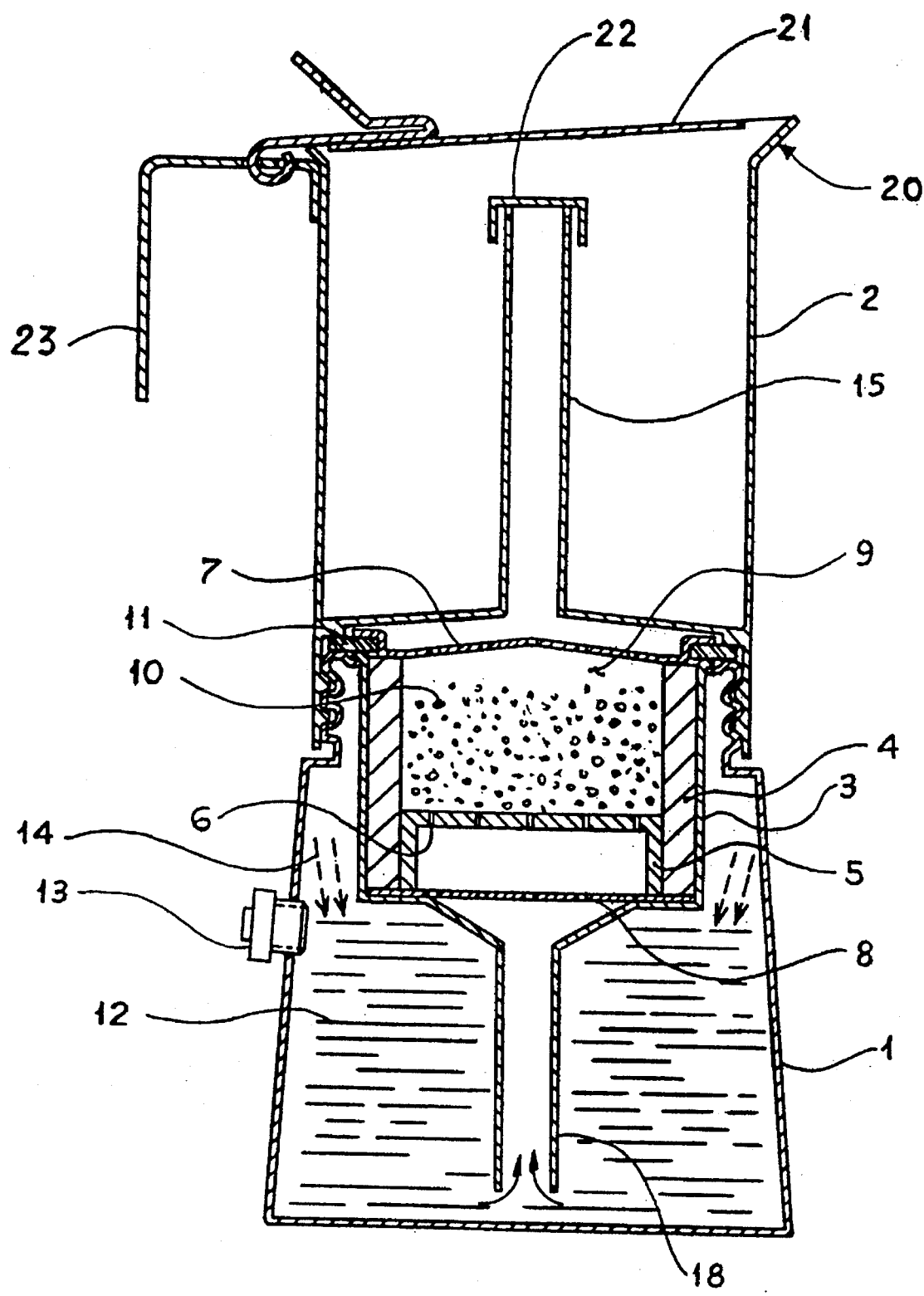
FIG. 1 is a sectional view illustrating the components embodying the invention.
Figure 4:
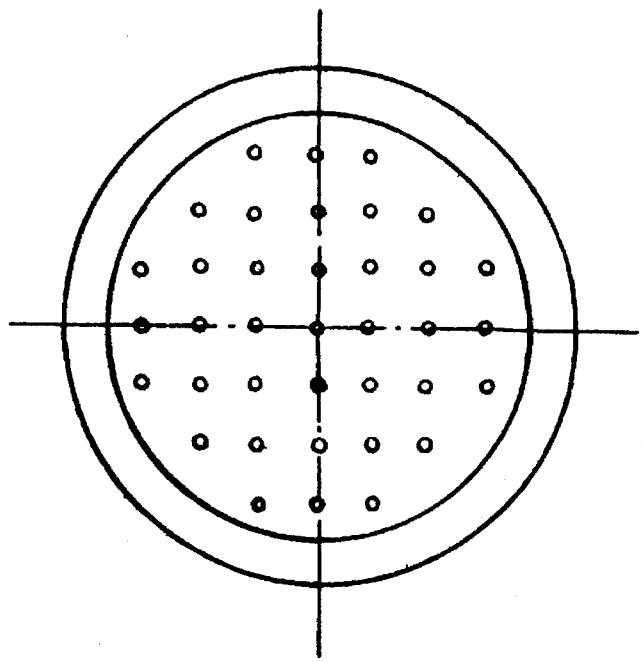
FIG. 4 is a top view of the upper perforated plate.
Figure 5:
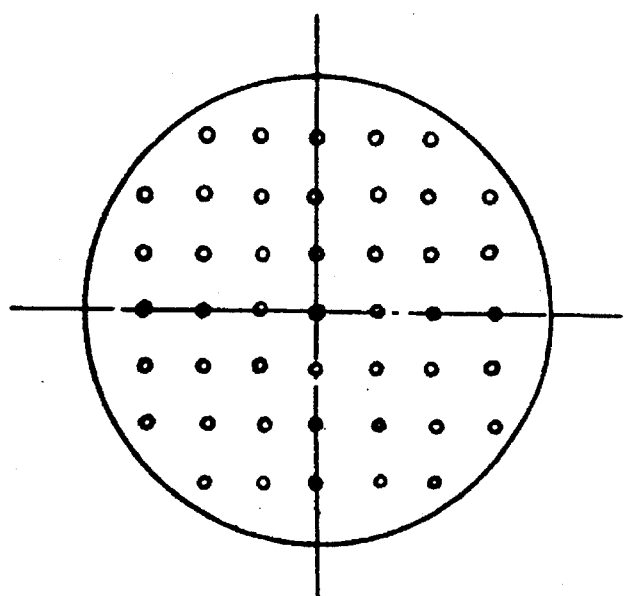
FIG. 5 is a top view of the lower perforated plate.

FIG. 1 shows a coffee maker 20 for expresso coffee which includes a lower truncated-cone container 1, an upper cylindrical container assembly 2, a coffee basket assembly 3 having a stem 18 nested into the lower truncated-cone container 1, a cylindrical coffee holder 4 centered in the upper portion of coffee basket assembly 3, a piston 5 having a series of apertures 6, FIG. 3, upper and lower perforated plates 7 and 8 respectively located in the upper cylindrical container 2 and in the coffee basket assembly 3, a gasket 11 of heat and hot water resistant elastomeric material is nested in the upper cylindrical container 2 to seal the lower truncated-cone container 1 to allow it to be pressurized. The upper cylindrical container assembly 2 is composed of a lid 21, a handle 23, an inverted funnel 15, having at its upper end a cap 22 which forces the flow of fluid and steam to go downwards into the lower portion of the upper cylindrical container assembly 2, FIG. 2.

The internal cylindrical surface of cylindrical coffee holder 4 is finished to a surface texture of 63 microinches, or finer, to allow proper sliding of piston 5; both cylindrical coffee holder 4 and piston 5 are made of metal parts, preferably of stainless steel.

In accordance with the principle of this invention the lower truncated-cone container 1 is filled with water 12, up to the relief valve 13 set at 40 psi (276 KpA) maximum pressure. Coffee basket assembly 3, with cylindrical coffee holder 4 and piston 5, is positioned in the lower container 1, the coffee chamber 9 is filled with ground coffee 10. The upper container 2 is threadably engaged onto the lower container 1 and tightened to form a hermetic seal. The ratio of piston 5 diameter to its height, can vary greatly, the optimal ratio for practical purpose, is between two to one (2:1) and one to one (1:1).

The coffee maker 20 is heated-on a burner, or other heating element, as steam 14 develops hot water 12 is pushed down and forced to enter stem 18 of coffee basket assembly 3 at the lower end, which stands off from the bottom of the lower container 1, allowing sufficient clearance for the water and steam to enter and then upwards through the apertures 6 of piston 5, the apertures 6 are sized as to create a differential pressure above and below the piston. The differential pressure pushes the piston upwards, thus compressing the ground coffee in chamber 9. Experiments have indicated a differential pressure between 15 and 30 psi (103 and 206 kPa) and temperatures between 250 and 273 degree F. (121 and 134 degree C.) to be satisfactory. Although this range is preferable it is not obviously a limitation of the system, as pressure and temperature can be increased or decreased by reducing or enlarging the apertures 6, the limitation being the pressure relief valve 13 which is set at 40 psi (276 kPa). FIG. 2 shows piston 5 compressing ground coffee 10 during the coffee brewing process, while hot water 12 and steam 14 are passing through the ground coffee 10 in chamber 9. The water extract of the coffee grounds passing through the upper perforated plate 7, through inverted funnel 15 and into the upper container 2. The upward movement of piston 5 keeps coffee grounds 10 compressed during the passage of superheated hot water and steam through the coffee grounds extracting the coffee brew. The force of compression on the coffee grounds, during the passage of water and steam is a function of differential pressure, not a function of volume, consequently variable amounts of coffee are exposed to equal compressive force.

Experiments have proven that the brewing time, in the instant invention, i.e., the time for the superheated water and the steam to pass through ground coffee 10 is longer when compressed than that in a common expresso coffee maker. This time increase is from one to two times longer than in uncompressed coffee grounds. Further, the instant expresso coffee maker requires reduced amounts of ground coffee to develop the full expresso flavor.

The disclosed details are exemplary only and are not to be taken as limitations on this invention, they should not be construed as limiting the scope of this invention but merely providing illustrations of some of the presently preferred embodiments of this invention.

Thus the scope of the invention should be determined by the appended claims and their legal equivalents, rather than by the examples given.

What is claimed is:

1. An improved expresso coffee maker comprising an interlocking assembly of four components, the first of said components being an upper brewed coffee holder, the second of said components being a lower water heating container, the third of said components being a coffee grounds holder located between said upper brewed coffee holder and said lower water heating container, the fourth component being a piston, said piston being located within said coffee grounds holder to form a coffee brewing assembly, the external dimensions of said piston closely complying with the internal dimensions of said coffee grounds holder, said coffee brewing assembly having a hollow stem which extends from its base; said improved expresso coffee maker being formed by threadably assembling said upper brewed coffee holder, said coffee brewing assembly and said lower water heating container to effect an hermetic seal between said components.

2. The upper brewed coffee holder according to claim 1 comprising a cylindrical outer container, a lid extending over the top of said container, a handle extending from the side of said container, an inverted funnel internally extending from said container's base, said inverted funnel having a cap to direct the flow of brewed coffee into the base of said upper brewed coffee holder; the outer wall of said cylindrical container extending beyond said container's base, the internal portion of said extended outer wall having a groove and threads, said grove adopted to holding an elastomeric gasket, said threads to engage the coffee brewing assembly and truncated cone base of the improved expresso coffee maker.

3. The water heating container according to claim 1 comprising a truncated cone, said cone having a flat base to engage a heating element, a cylindrical top, said top having threads extending around said tops outer wall, a pressure relief valve being located in and through said truncated cone's wall, said relief valve being set to vent at 40 psi (276 KPA), said threaded cylindrical top engaging the cylindrical top of the improved coffee holder.

4. The coffee brewing assembly according to claim 1 comprising a cylindrical coffee grounds holder, the internal wall of said coffee holder being finished to a surface texture of 63 microinches, a piston which conforms to the internal dimensions of said coffee holder, the upper surface of said piston being perforated, said coffee brewing assembly having a hollow stem which extends from its base, said hollow stem extending into the water heating container when the components of the improved expresso coffee maker are assembled.

5. The cylindrical coffee grounds holder according to claim 1 which includes to claim 4 which includes upper and lower perforated plates, an upper and lower perforated plates, said upper perforated plate acting to confine coffee grounds in said coffee holder, said lower perforated plate acting to support the piston when the coffee brewing assembly is being assembled.

6. A method of making improved expresso coffee utilizing the improved coffee maker according to claim 1 comprising placing the piston on the lower perforated plate in the coffee holder, placing coffee grounds on said piston, securing the upper perforated plate on said coffee grounds, to form the coffee brewing assembly, placing water in the water heating container, placing said coffee brewing assembly into said water heating container, threadably engaging the brewed coffee container onto said water heating container containing said coffee brewing assembly to effect an hermetic seal between the components forming said improved expresso maker; placing said improved expresso maker containing coffee grounds and water upon a heating element, heating said water in said water container generating steam, said steam and heated water passing through the stem and lower perforated plate of said coffee brewing assembly, said steam applying pressure on said piston, said piston applying pressure on said coffee grounds in said coffee holder, said steam and said heated water passing through the perforations in said piston, then through said coffee grounds, then through said upper perforated plate in said coffee holder, then through the inverted funnel in the base of said brewed coffee container, into said brewed coffee container.

\* \* \* \* \*